(12) United States Patent
Ko et al.

(10) Patent No.: US 8,489,902 B2
(45) Date of Patent: Jul. 16, 2013

(54) SEMICONDUCTOR INTEGRATED CIRCUIT

(75) Inventors: Jae Bum Ko, Ichon-shi (KR); Sang Jin Byeon, Ichon-shi (KR)

(73) Assignee: SK Hynix Inc., Gyeonggi-do (KR)

( * ) Notice: Subject to any disclaimer, the term of this patent is extended or adjusted under 35 U.S.C. 154(b) by 343 days.

(21) Appl. No.: 12/839,333

(22) Filed: Jul. 19, 2010

(65) Prior Publication Data

US 2011/0210780 A1     Sep. 1, 2011

(30) Foreign Application Priority Data

Feb. 26, 2010   (KR) .................. 10-2010-0017743

(51) Int. Cl.
| | |
|---|---|
| G06F 1/00 | (2006.01) |
| G06F 1/12 | (2006.01) |
| H03K 19/096 | (2006.01) |
| H03L 7/00 | (2006.01) |
| H03H 11/16 | (2006.01) |
| H03H 11/26 | (2006.01) |
| G11C 5/02 | (2006.01) |
| G11C 5/06 | (2006.01) |
| G01R 13/00 | (2006.01) |
| G01R 25/00 | (2006.01) |

(52) U.S. Cl.
USPC ............ 713/300; 713/400; 713/500; 326/96; 327/141; 327/231; 327/261; 365/51; 365/63; 702/66; 702/79

(58) Field of Classification Search
USPC ............ 713/300, 400, 500; 326/93; 327/141, 327/231, 261; 365/51, 63; 702/66, 79
See application file for complete search history.

(56) References Cited

U.S. PATENT DOCUMENTS

| | | | |
|---|---|---|---|
| 6,313,676 B1 | 11/2001 | Abe et al. | |
| 6,601,177 B1 * | 7/2003 | Fujigaya et al. | 713/300 |
| 7,039,825 B2 * | 5/2006 | Furukawa et al. | 713/600 |
| 7,111,149 B2 | 9/2006 | Eilert | |
| 7,447,289 B2 * | 11/2008 | Uratani et al. | 375/371 |
| 7,487,370 B2 * | 2/2009 | Shiratake et al. | 713/300 |
| 7,513,310 B2 | 4/2009 | Fossli | |
| 7,564,123 B1 | 7/2009 | Wang et al. | |
| 7,598,617 B2 | 10/2009 | Lee et al. | |
| 8,054,663 B2 * | 11/2011 | Chung | 365/51 |
| 8,063,509 B2 * | 11/2011 | Okano | 307/43 |
| 2008/0282102 A1 * | 11/2008 | Reddy et al. | 713/323 |
| 2009/0091962 A1 | 4/2009 | Chung et al. | |
| 2009/0237970 A1 | 9/2009 | Chung | |

* cited by examiner

*Primary Examiner* — Stefan Stoynov
(74) *Attorney, Agent, or Firm* — William Park & Associates Patent Ltd.

(57) ABSTRACT

A semiconductor integrated circuit includes: a plurality of chips configured to receive an external voltage. Each one of the chips detects a signal delay characteristic of the one of the chips to generate an internal voltage having a level corresponding to the signal delay characteristic.

13 Claims, 7 Drawing Sheets

SEMICONDUCTOR INTEGRATED CIRCUIT

CROSS-REFERENCES TO RELATED APPLICATION

The present application claims priority under 35 U.S.C. §119(a) to Korean Application No. 10-2010-0017743, filed on Feb. 26, 2010, in the Korean Intellectual Property Office, which is incorporated herein by reference as if set forth in its entirety.

BACKGROUND

1. Technical Field

The present invention generally relates to semiconductor integrated circuits, and more particularly, to semiconductor integrated circuits capable of reducing the effect of skew across a plurality of chips therein.

2. Related Art

FIG. 1 is a block diagram of a conventional semiconductor integrated circuit. As illustrated in FIG. 1, a conventional semiconductor integrated circuit 1 may include a plurality of chips CHIP0 through CHIPn.

The plurality of chips CHIP0 through CHIPn may all be configured in the same manner. The plurality of chips CHIP0 through CHIPn may commonly receive an external voltage VDD and an external clock signal CLK from outside the plurality of chips CHIP0 through CHIPn.

One chip CHIP0 of the plurality of chips CHIP0 through CHIPn may include a clock buffer 11 and a plurality of circuit blocks BLK0 to BLKm.

The clock buffer 11 may receive the external clock signal CLK to generate an internal clock signal ICLK which may be suitably used in the chip.

The plurality of circuit blocks BLK0 through BLKm may receive the external voltage VDD and the internal clock signal ICLK to perform predetermined functions.

The plurality of chips CHIP0 through CHIPn may be implemented as chips that are manufactured by a semiconductor process and determined to be good products through a test. In this case, the respective chips may be manufactured by different manufacturing processes, and a skew may exist between the chips manufactured by different manufacturing processes. That is, the chips may have different signal delay characteristics.

However, the plurality of circuit blocks BLK0 through BLKm are operated in accordance with the same external voltage VDD, even though the signal delay characteristics thereof are different from each other.

Therefore, when any one of a plurality of chips included in a semiconductor integrated circuit is manufactured by a different process, a skew may occur. The skew may cause an operation error in the semiconductor integrated circuit.

SUMMARY

Disclosed embodiments provide semiconductor integrated circuits capable of uniformizing operation characteristics of a plurality of chips.

In one exemplary embodiment, a semiconductor integrated circuit is provided, including, for example: a plurality of chips configured to receive an external voltage, wherein each one of the chips is configured to detect a signal delay characteristic of the one of the chips to generate an internal voltage having a level corresponding to the signal delay characteristic.

In another exemplary embodiment, a semiconductor integrated circuit is provided, including, for example: a first chip configured to operate an internal circuit block in accordance with a first internal voltage having a level corresponding to a first signal delay characteristic; and a second chip configured to operate an internal circuit block in accordance with a second internal voltage having a level corresponding to a second signal delay characteristic. The first signal delay characteristic and the second signal delay characteristic are internally detected. The first level of the first internal voltage may change based on a difference between a target signal delay characteristic and the first signal delay characteristic. The second level of the second internal voltage changes based on a difference between the target signal delay characteristic and the second signal delay characteristic.

In another exemplary embodiment, a semiconductor integrated circuit is provided, including, for example: a plurality of chips. Each one of the chips may operate an internal circuit block, based on an internal voltage having an independent level corresponding to a signal delay characteristic of the chip, in order to compensate for a skew between output signals of the plurality of chips.

BRIEF DESCRIPTION OF THE DRAWINGS

Features, aspects, and embodiments are described in conjunction with the attached drawings, in which.

DETAILED DESCRIPTION

Figure 1:
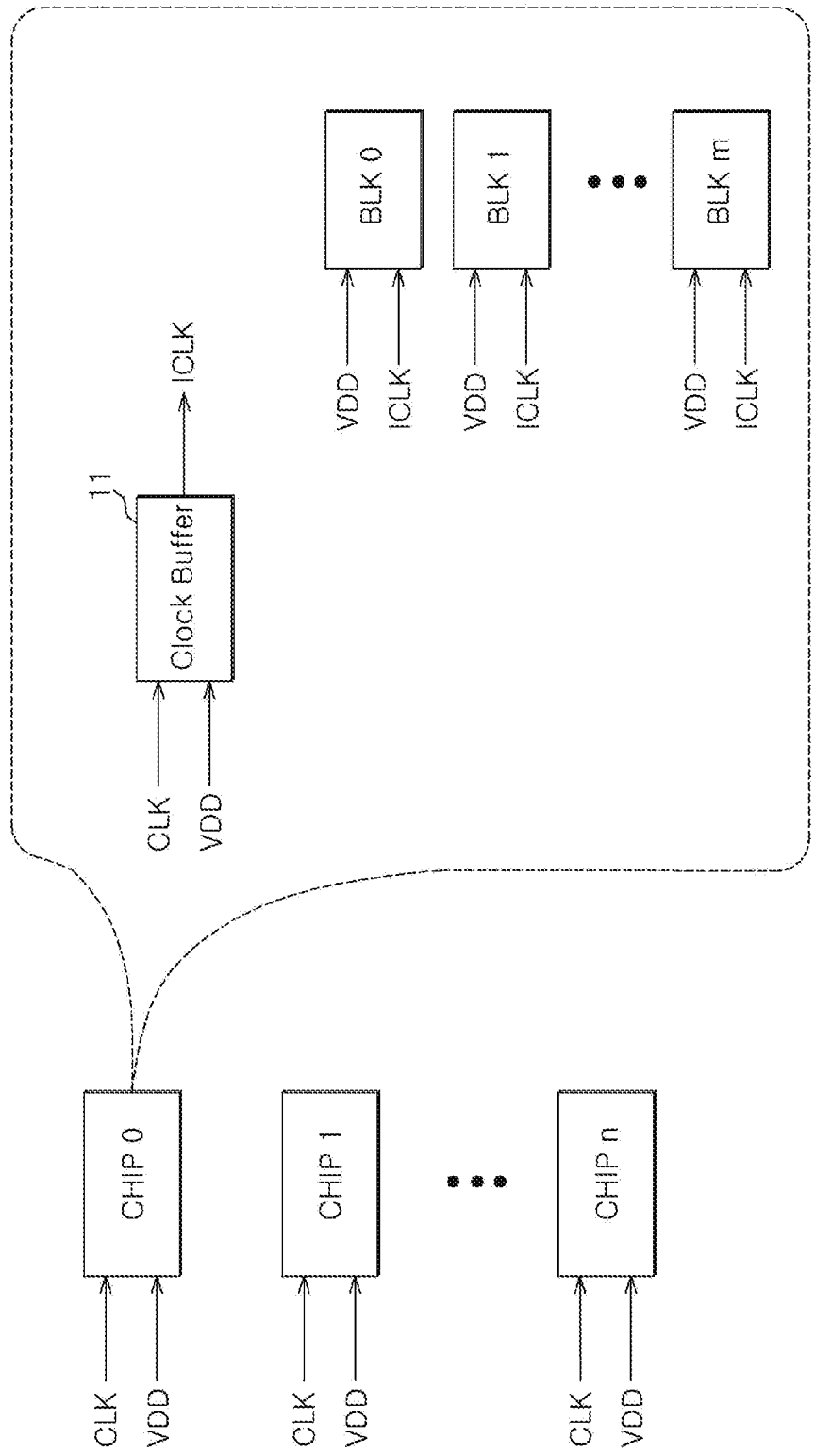
FIG. 1 is a block diagram of a conventional semiconductor integrated circuit.

Reference will now be made in detail to the exemplary embodiments consistent with the present disclosure, examples of which are illustrated in the accompanying drawings. Whenever possible, same reference numerals will be used throughout the drawings to refer to the same or like parts.

Figure 2:
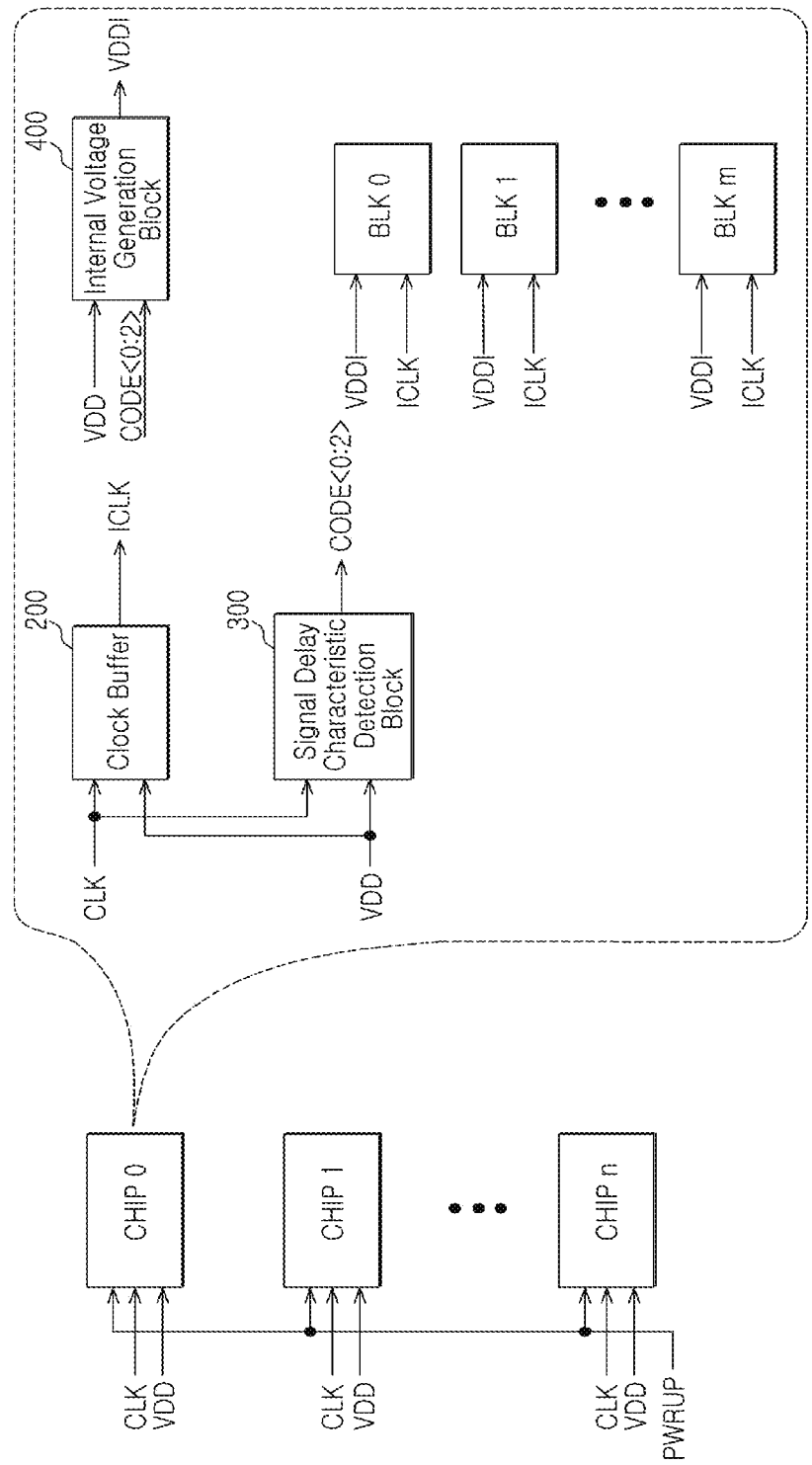
FIG. 2 is a block diagram of a semiconductor integrated circuit according to one embodiment of the invention.

FIG. 2 illustrates a semiconductor integrated circuit 100 according to one embodiment of the invention. Semiconductor integrated circuit 100 may include a plurality of chips CHIP0 through CHIPn.

The plurality of chips CHIP0 through CHIPn may commonly receive an external voltage VDD, an external clock signal CLK, and a power-up signal PWRUP from outside the plurality of chips CHIP0 through CHIPn.

The chip CHIP0 may include a clock buffer 200, a signal delay characteristic detection block 300, an internal voltage generation block 400, and a plurality of circuit blocks BLK0 through BLKm.

The clock buffer 200 may be configured to receive the external clock signal CLK to generate an internal clock signal ICKL that may be used by the chip.

The signal delay characteristic detection block 300 may be configured to detect a signal delay characteristic of the chip using the external clock signal CLK and to generate a code signal CODE<0:2> corresponding to the signal delay characteristic.

The internal voltage generation block 400 may be configured to control the level of an internal voltage VDDI based on the code signal CODE<0:2> and to output the internal voltage VDDI.

The plurality of circuit blocks BLK0 through BLKm may receive the internal voltage VDDI and the internal clock signal ICLK to perform a predetermined function.

Figure 3:
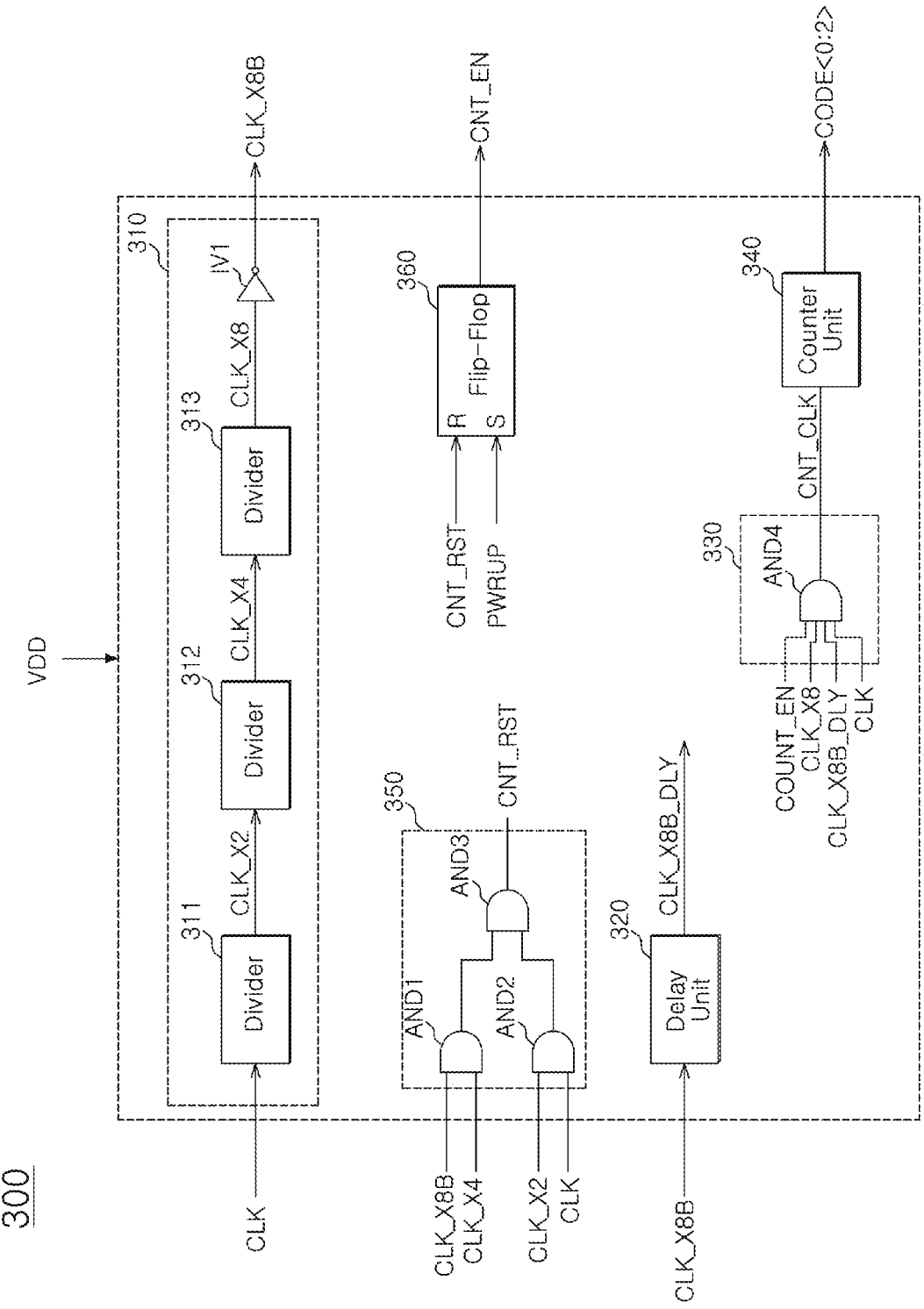
FIG. 3 is a circuit diagram of one exemplary embodiment of a signal delay characteristic detection block shown in FIG. 2.

FIG. 3 is a circuit diagram of one exemplary embodiment of the signal delay characteristic detection block 300 shown in FIG. 2. The signal delay characteristic detection block 300 may include a frequency division unit 310, a delay unit 320, a combination unit 330, a counter unit 340, a reset signal generation unit 350, and a flip-flop 360.

The frequency division unit 310 may include a plurality of dividers 311, 312, and 313 and an inverter IV1.

The plurality of dividers 311 through 313 may be configured to sequentially divide the external clock signal CLK to generate a plurality of divided clock signals CLK_X2, CLK_X4, CLK_X8, and CLK_X8B.

The delay unit 320 may be configured to delay the divided clock signal CLK_X8B to generate a delayed divided clock signal CLK_X8B_DLY.

The combination unit 330 may be configured to logically multiply the divided clock signal CLK_X8, the delayed divided clock signal CLK_X8B_DLY, the external clock signal CLK, and a count enable signal CNT_EN to generate a count clock signal CNT_CLK.

The counter unit 340 may be configured to count the count clock signal CNT_CLK to generate the code signal CODE<0:2>.

The reset signal generation unit 350 may be configured to logically multiply the divided clock signals CLK_X2, CLK_X4, and CLK_X8 and the external clock signal CLK to generate a count reset signal CNT_RST.

The flip-flop 360 may be configured to generate the count enable signal CNT_EN in response to a count power-up signal PWRUP and the counter reset signal CNT_RST.

Figure 4:
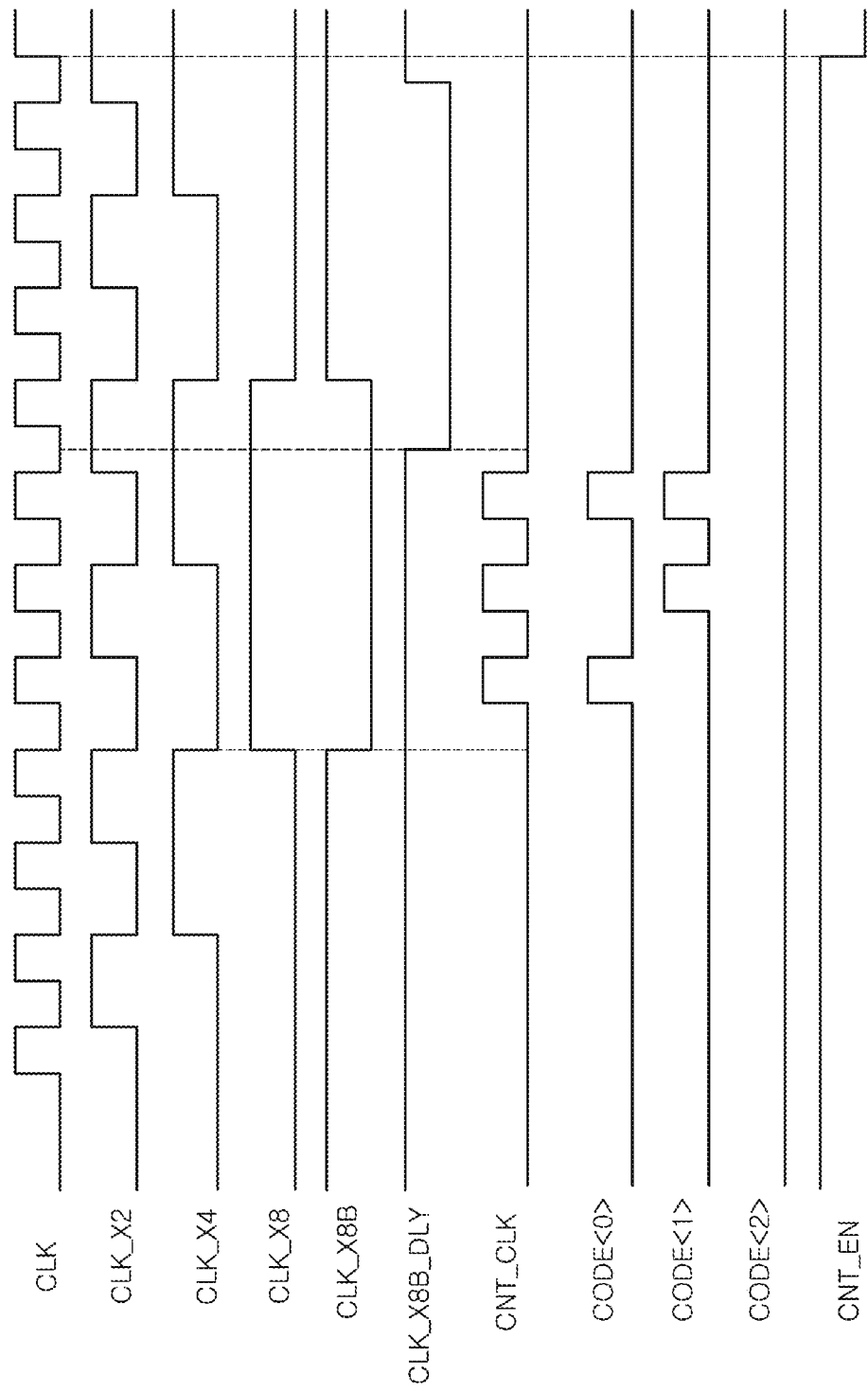
FIG. 4 is a timing diagram representing an example of the operation of the signal delay characteristic detection block shown in FIG. 2 and FIG. 3.

FIG. 4 is a timing diagram representing an example of the operation of the signal delay characteristic detection block 300. The operation of the signal delay characteristic detection unit 300 will be described below with reference to FIGS. 3 and 4. Here, it is assumed that n is 2 in the code signal CODE<0:n>.

The divided clock signals CLK_X2, CLK_X4, CLK_X8, and CLK_X8B may be generated by the plurality of dividers 311 through 313 and the inverter IV1.

The delayed divided clock signal CLK_X8B_DLY may be generated by the delay unit 320.

Here, the delay unit 320 may have the same signal delay characteristic of the chip CHIP0, because the delay unit 320 is manufactured through the same manufacturing process of the chip CHIP0.

As the count clock signal CNT_CLK, the combination unit 330 may output the external clock signal CLK during a high-level interval of the divided clock signal CLK_X8 and the delayed divided clock signal CLK_X8B_DLY while the count enable signal CNT_EN is activated.

FIG. 4 shows an example where three pulses of the external clock signal CLK are outputted as the count clock signal CNT_CLK.

Here, while an external voltage VDD having the same level is supplied, a signal delay time may be relatively long or short based on the manufacturing process. That is, the delay units 320 provided in the respective chips CHIP0 through CHIPn may have a relatively long or short delay time.

Therefore, a chip with a relatively short delay time, compared to other ones of the plurality of chips CHIP0 through CHIPn, is may output two pulses of the external clock signal CLK as the count clock signal CNT_CLK. On the other hand, a chip of with a relatively long delay time may output four pulses of the external clock signal CLK as the count clock signal CNT_CLK.

The counter 340 may count the count clock signal CNT_CLK to generate the code signals CODE<0:2>.

In other words, the plurality of chips CHIP0 through CHIPn may output the code signals CODE<0:2> based on their signal delay characteristics.

Here, the chips with substantially identical signal delay characteristics, among the plurality of chips CHIP0 through CHIPn, may output the code signals CODE<0:2> having the same value. On the other hand, the chips that do not have identical signal delay characteristics may output the code signals CODE<0:2> having different values.

Meanwhile, after the code signals CODE<0:2> are generated, the count enable signal CNT_EN may be used to limit the operation of the signal delay characteristic detection block 300.

The count enable signal CNT_EN may be activated in response to the activation of the power-up signal PWRUP (not shown) to inform that the power level of the semiconductor integrated circuit is stabilized, and may be deactivated by the count reset signal CNT_RST, as shown in FIG. 4.

After the count reset signal CNT_RST is deactivated, the count clock signal CNT_CLK may not be generated. Accordingly, the operation of the counter unit 340 may be stopped.

Figure 5:
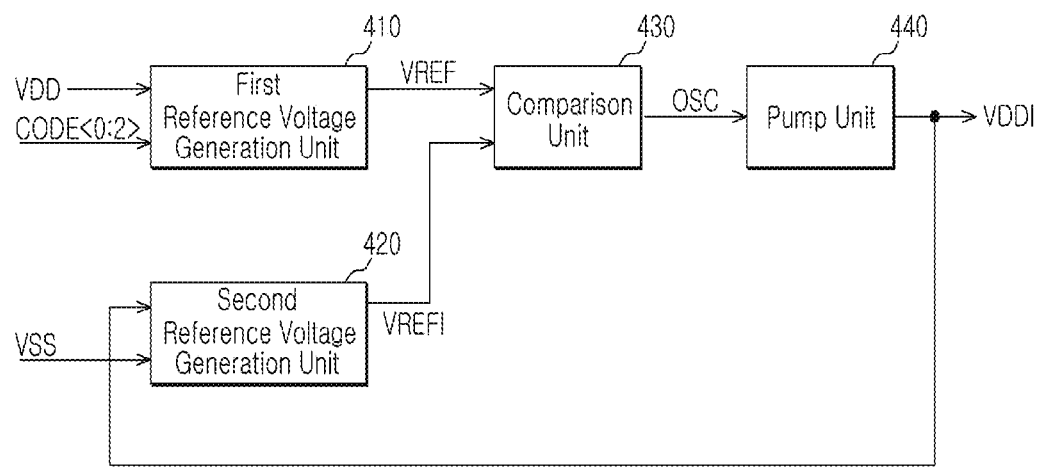
FIG. 5 is a block diagram illustrating the internal configuration of one exemplary embodiment of an internal voltage generation block shown in FIG. 2.

FIG. 5 illustrates one embodiment of the internal configuration of the internal voltage generation block 400 shown in FIG. 2. The internal voltage generation block 400 may include a first reference voltage generation unit 410, a second reference voltage generation unit 420, a comparison unit 430, and a pump unit 440.

The first reference voltage generation unit 410 and the second reference voltage generation unit 420 may be configured in the same manner.

The first reference voltage generation unit 410 may be configured to generate a first reference voltage VREF using the external voltage VDD based on the code signals CODE<0:2>.

The second reference voltage generation unit 420 may be configured to generate a second reference voltage VREFI using the internal voltage VDDI. The second reference voltage generation unit 420 may receive a ground voltage level VSS instead of the code signals CODE<0:2>.

The comparison unit 430 may be configured to compare the first reference voltage VREF and the second reference voltage VREFI to generate a pump driving signal OSC.

The comparison unit 430 may deactivate the pump driving signal OSC when the first reference voltage VREF is lower than the second reference voltage VREFI. The comparison unit 430 may also activate the pump driving signal OSC when the second reference voltage VREFI is lower than the first reference voltage VREF.

The pump unit 440 may be configured to pump the internal voltage VDDI in response to the activation of the pump driving signal OSC.

Figure 6:
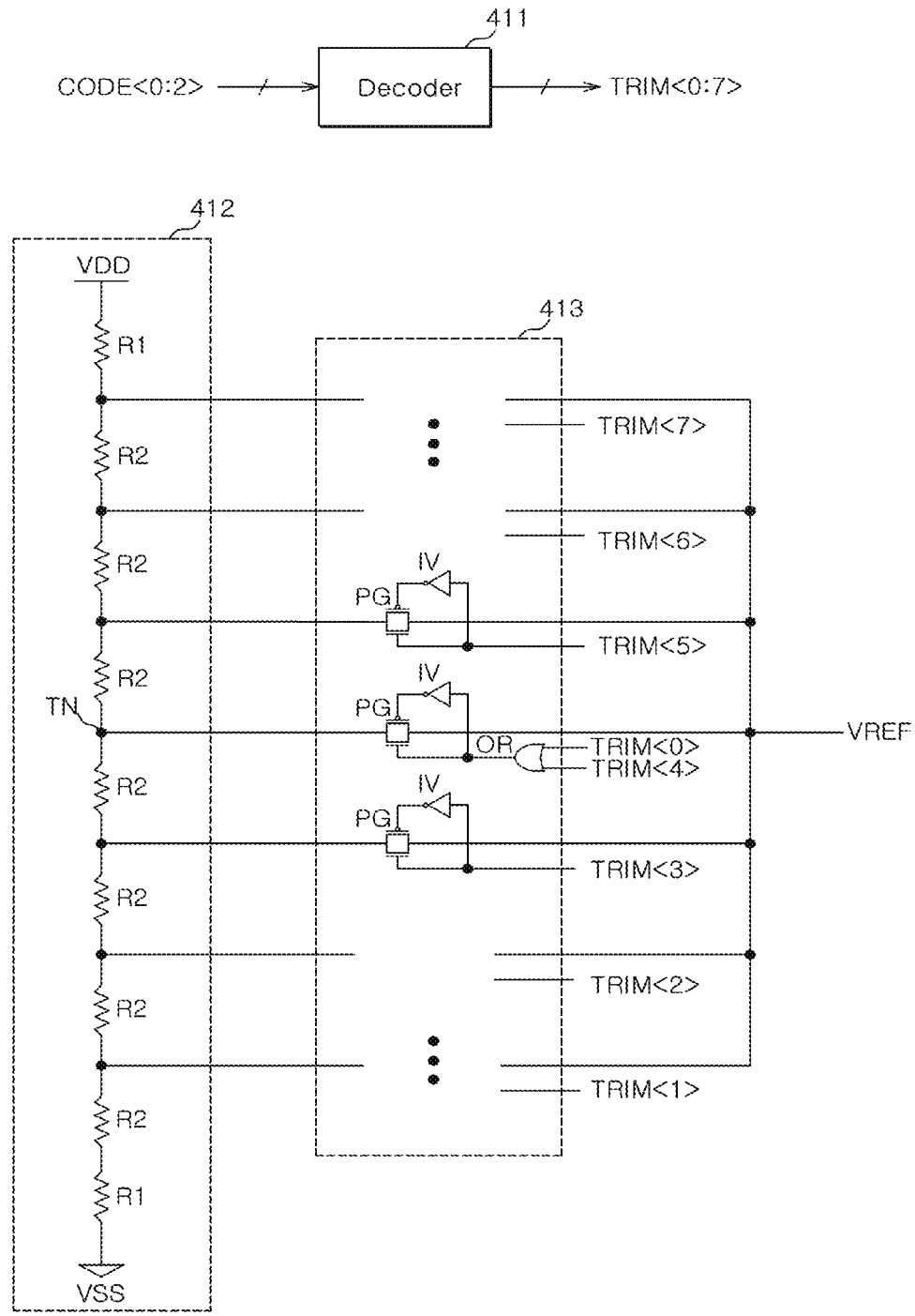
FIG. 6 is a circuit diagram of one exemplary embodiment of a first reference voltage generation unit shown in FIG. 5.

FIG. 6 is a circuit diagram of one exemplary embodiment of the first reference voltage generation unit 410. The first reference voltage generation unit 410 may include a decoder 411, a division resistor array 412, and a switching section 413.

The decoder 411 may be configured to decode the code signals CODE<0:2> to generate voltage control signals TRIM<0:7>.

The division resistor array 412 may include a plurality of resistors R1 and R2 connected between an external voltage terminal VDD and a ground voltage terminal VSS.

The switching section 413 may select one of a plurality of nodes of the resist array 412 in response to the voltage control signals TRIM<0:7>. The switching section 413 may connect the selected node to an output terminal of the first reference voltage VREF.

The switching section 413 may include a plurality of pass gates PG, a plurality of inverters IV, and an OR gate OR.

In the embodiment, a pass gate PG may be connected to a target node TN among the nodes in the division resistor array 412.

The pass gate PG may be configured to connect the target node TN to the output terminal of the first reference voltage VREF when any one of the voltage control signals TRIM<0> and TRIM<4> is activated. The other pass gates PGs may receive one-bit voltage control signals TRIM<1:3> and TRIM<5:7>.

The code signal CODE<0:2> outputted from the counter unit 340 of FIG. 3 may have an initial value corresponding to a logic value '0' before the signal delay characteristic detection. When the decoder 411 decodes the code signal CODE<0:2>, the voltage control signal TRIM<0> may be activated. Therefore, the switching section 413 may be configured in the above-described manner in order to prevent the level of the internal voltage VDDI from excessively decreasing during the initial operation.

Furthermore, when the second reference voltage generation unit 420 receives the ground voltage level VSS instead of the code signal CODE<0:2>, the voltage control signal TRIM<0> may be activated. A node connected in response to the voltage control signal TRIM<0> may correspond to a node at the same position as the target node TN of the first reference voltage generation unit 410.

Therefore, the internal voltage generation block 400 may increase or decrease the level of the internal voltage VDDI to more or less than the level of the external voltage VDD based on the code signal CODE<0:2>.

That is, the first reference voltage generation unit 410 may generate the first reference voltage VREF based on the code signal CODE<0:2>.

The second reference voltage generation unit 420 may divide the internal voltage VDDI at a predetermined division ratio (e.g., 1/2) through a fixed node of the division resistor array 412 to is generate the second reference voltage VREF.

The comparison unit 430 may activate the pump driving signal OSC when the first reference voltage VREF is lower than the second reference voltage VREFI. When the pump driving signal OSC is activated, the pump unit 440 may perform a pumping operation to increase the level of the internal voltage VDDI.

When the level of the first reference voltage VREF becomes higher than that of the second reference voltage VREFI, the operation of the pump unit 440 may be stopped.

The above-described operation may be repeated to maintain the level of the internal voltage VDDI to a target level.

In the above-described embodiment, the plurality of chips generate the code signals CODE<0:2>, which independently have signal delay characteristic information. Accordingly, the level of the internal voltage VDDI may be controlled to a level suitable for the characteristics of the respective chips.

Figure 7:
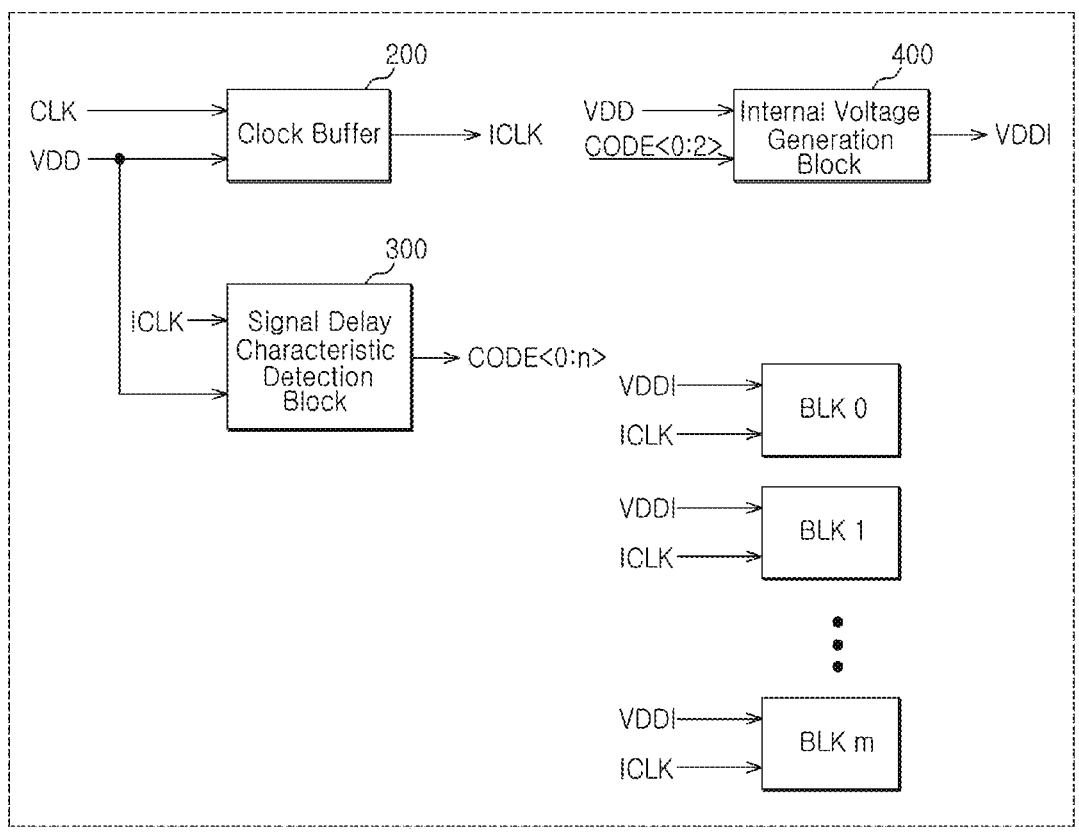
FIG. 7 is a block diagram illustrating the internal configuration of a chip in a semiconductor integrated circuit according to another embodiment of the invention.

FIG. 7 is a block diagram illustrating the internal configuration of a chip 0 in a semiconductor integrated circuit according to another embodiment of the invention. The chip 0 illustrated in FIG. 7 may include a clock buffer 200, a signal delay characteristic detection block 300, and an internal voltage generation block. The signal delay characteristic detection block 300 may be configured to detect signal delay characteristics using the internal clock signal ICLK instead of the external clock signal CLK, as shown in FIG. 2. The signal delay characteristic detection block 300 may generate the code signals CODE<0:2>.

The circuit configuration of chip 0 illustrated in FIG. 7 may be the same as that of the chip 0 illustrated in FIG. 2. However, since the swing width of the internal clock signal ICLK is larger than that of the external clock signal, the signal delay characteristics may be detected more precisely than when the internal clock signal CLK is used. As a result, it is possible to further reduce a skew between the chips.

In a semiconductor integrated circuit according to an embodiment of the present invention, a plurality of chips may detect their signal delay characteristics and use independent internal voltages generated in correspondence to the signal delay characteristics. Therefore, a skew difference between the chips may be reduced to improve the operation characteristic of the semiconductor integrated circuit.

While certain embodiments have been described above with reference to illustrative examples for particular applications, it will be understood to those skilled in the art that the embodiments described are by way of example only. Those skilled in the art with access to the teachings provided in this disclosure will recognize additional modifications, applications, and/or embodiments and additional fields in which the present disclosure would be of significant utility. Accordingly, the semiconductor integrated circuit described herein should not be limited based on the described embodiments. Rather, the semiconductor integrated circuit described herein should only be limited in light of the claims that follow when taken in conjunction with the above description and accompanying drawings.

What is claimed is:

1. A semiconductor integrated circuit comprising: a plurality of chips configured to receive an external voltage,
    wherein each one of the chips is configured to detect a signal delay characteristic of the one of the chips to generate an internal voltage having a level corresponding to the signal delay characteristic,
    wherein each one of the chips comprises:
    a signal delay characteristic detection block configured to detect the signal delay characteristic using a clock signal and to generate a code signal corresponding to the signal delay characteristic by counting the clock signal; and
    an internal voltage generation block configured to control a level of the internal voltage based on the code signal and to output the internal voltage,
    wherein the count clock signal is generated in a delay interval of a divided clock signal based on the divided clock signal, a delayed divided clock signal, and the clock signal,
    wherein the divided clock signal is generated by dividing frequency of the clock signal, and
    wherein the delayed divided clock signal is generated by delaying the divided clock signal.

2. The semiconductor integrated circuit according to claim 1, wherein the signal delay characteristic detection block comprises:
    a frequency division unit configured to divide frequency of the clock signal to generate a divided clock signal;
    a delay unit configured to delay the divided clock signal to generate a delayed divided clock signal;

a combination unit configured to combine the divided clock signal, the delayed divided clock signal, and the clock signal to generate a count clock signal; and
a counter unit configured to count the count clock signal to generate the code signal.

3. The semiconductor integrated circuit according to claim 1, wherein the internal voltage generation block comprises:
a first reference voltage generation unit configured to generate a first reference voltage using the external voltage based on the code signal;
a second reference voltage generation unit configured to generate a second reference voltage by dividing the internal voltage at a preset division ratio;
a comparison unit configured to activate a pump driving signal by comparing the first reference voltage and the second reference voltage; and
a pump unit configured to pump the internal voltage in response to the activation of the pump driving signal.

4. A semiconductor integrated circuit comprising:
a first chip configured to operate an internal circuit block in accordance with a first internal voltage having a first level corresponding to a first signal delay characteristic; and
a second chip configured to operate an internal circuit block in accordance with a second internal voltage having a second level corresponding to a second signal delay characteristic,
wherein the first signal delay characteristic and the second signal delay characteristic are internally detected,
wherein the first level of the first internal voltage changes based on a difference between a target signal delay characteristic and the first signal delay characteristic,
wherein the second level of the second internal voltage changes based on a difference between the target signal delay characteristic and the second signal delay characteristic,
wherein the first chip comprises:
a signal delay characteristic detection block configured to detect the first signal delay characteristic using an external clock signal and to generate a code signal corresponding to the first signal delay characteristic by counting the clock signal; and
an internal voltage generation block configured to control a level of the first internal voltage based on the code signal,
wherein the count clock signal is generated in a delay interval of a divided clock signal based on the divided clock signal, a delayed divided clock signal, and the external clock signal,
wherein the divided clock signal is generated by dividing the external clock signal, and
wherein the delayed divided clock signal is generated by delaying the divided clock signal.

5. The semiconductor integrated circuit according to claim 4, wherein the signal delay characteristic detection block comprises:
a frequency division unit configured to divide frequency of the external clock signal to generate a divided clock signal;
a delay unit configured to delay the divided clock signal to generate a delayed divided clock signal;
a combination unit configured to combine the divided clock signal, the delayed divided clock signal, and the external clock signal to generate a count clock signal; and
a counter unit configured to count the count clock signal to generate the code signal.

6. The semiconductor integrated circuit according to claim 4, wherein the internal voltage generation block comprises:
a first reference voltage generation unit configured to generate a first reference voltage using the external voltage based on the code signal;
a second reference voltage generation unit configured to divide the internal voltage at a preset division ratio to generate a second reference voltage;
a comparison unit configured to compare the first reference voltage and the second reference voltage to activate a pump driving signal; and
a pump unit configured to pump the internal voltage in response to the activation of the pump driving signal.

7. The semiconductor integrated circuit according to claim 4, wherein the first chip comprises:
a clock buffer configured to receive the external clock signal to generate an internal clock signal;
a signal delay characteristic detection block configured to detect the first signal delay characteristic using the internal clock signal and to generate a code signal corresponding to the first signal delay characteristic; and
an internal voltage generation block configured to control a level of the first internal voltage based on the code signal and to output the first internal voltage.

8. The semiconductor integrated circuit according to claim 7,
wherein the signal delay characteristic detection block is configured to count a count clock signal to generate the code signal
wherein the count clock signal is generated in a delay interval of a divided clock signal based on the divided clock signal, a delayed divided clock signal, and the internal clock signal,
wherein the divided clock signal is generated by dividing the internal clock signal, and
wherein the delayed divided clock signal is generated by delaying the divided clock signal, and generate the code signal.

9. The semiconductor integrated circuit according to claim 7, wherein the signal delay characteristic detection block comprises:
a frequency division unit configured to divide frequency of the internal clock signal to generate a divided clock signal;
a delay unit configured to delay the divided clock signal to generate a delayed divided clock signal;
a combination unit configured to combine the divided clock signal, the delayed divided clock signal, and the internal clock signal to generate a count clock signal; and
a counter unit configured to count the count clock signal to generate the code signal.

10. The semiconductor integrated circuit according to claim 7, wherein the internal voltage generation block comprises:
a first reference voltage generation unit configured to generate a first reference voltage using the external voltage based on the code signal;
a second reference voltage generation unit configured to divide the internal voltage at a preset division ratio to generate a second reference voltage;
a comparison unit configured to compare the first reference voltage and a second reference voltage to activate a pump driving signal; and
a pump unit configured to pump the internal voltage in response to the activation of the pump driving signal.

11. A semiconductor integrated circuit comprising a plurality of chips,
wherein each one of the chips operates an internal circuit block, based on an internal voltage having an independent level corresponding to a signal delay characteristic of the chip, in order to compensate for a skew between output signals of the plurality of chips,
wherein each one of the chips comprises:
a signal delay characteristic detection block configured to detect the signal delay characteristic using a clock signal and to generate a code signal corresponding to the signal delay characteristic by counting the clock signal; and
an internal voltage generation block configured to control a level of the internal voltage based on the code signal and to output the internal voltage,
wherein the count clock signal is generated in a delay interval of a divided clock signal based on the divided clock signal, a delayed divided clock signal, and the clock signal,
wherein the divided clock signal is generated by dividing the clock signal, and
wherein the delayed divided clock signal is generated by delaying the divided clock signal.

12. The semiconductor integrated circuit according to claim 11, wherein the signal delay characteristic detection block comprises:
a frequency division unit configured to divide frequency of the clock signal to generate a divided clock signal;
a delay unit configured to delay the divided clock signal to generate a delayed divided clock signal;
a combination unit configured to combine the divided clock signal, the delayed divided clock signal, and the clock signal to generate a count clock signal; and
a counter unit configured to count the count clock signal to generate the code signal.

13. The semiconductor integrated circuit according to claim 11, wherein the internal voltage generation block comprises:
a first reference voltage generation unit configured to generate a first reference voltage using the external voltage based on the code signal;
a second reference voltage generation unit configured to divide the internal voltage at a preset division ratio to generate a second reference voltage;
a comparison unit configured to compare the first reference voltage and the second reference voltage to activate a pump driving signal; and
a pump unit configured to pump the internal voltage in response to the activation of the pump driving signal.

* * * * *